US011338918B2

(12) United States Patent
Maxwell et al.

(10) Patent No.: US 11,338,918 B2
(45) Date of Patent: *May 24, 2022

(54) AIRSPACE TOLLING

(71) Applicant: Raytheon Company, Waltham, MA (US)

(72) Inventors: Katie J. Maxwell, Fishers, IN (US); Scott D. Harlan, Leesburg, VA (US); John S. Lear, Purcellville, VA (US); Luther John Durkop, III, Cedar Park, TX (US); Scott G. Barnes, Falls Church, VA (US)

(73) Assignee: Raytheon Company, Waltham, MA (US)

( * ) Notice: Subject to any disclaimer, the term of this patent is extended or adjusted under 35 U.S.C. 154(b) by 344 days.

This patent is subject to a terminal disclaimer.

(21) Appl. No.: 16/438,297

(22) Filed: Jun. 11, 2019

(65) Prior Publication Data

US 2019/0375503 A1 Dec. 12, 2019

Related U.S. Application Data

(60) Provisional application No. 62/683,421, filed on Jun. 11, 2018.

(51) Int. Cl.
*B64C 39/02* (2006.01)
*G08G 5/00* (2006.01)
*H04K 3/00* (2006.01)

(52) U.S. Cl.
CPC .......... *B64C 39/024* (2013.01); *G08G 5/006* (2013.01); *H04K 3/45* (2013.01); *B64C 2201/127* (2013.01); *B64C 2201/18* (2013.01)

(58) Field of Classification Search
CPC ............ B64C 39/024; B64C 2201/127; B64C 2201/18; G08G 5/006; H04K 3/45; G07B 15/00; G07C 5/008
See application file for complete search history.

(56) References Cited

U.S. PATENT DOCUMENTS 9,626,874 B1 * 4/2017 Gupta ................. G08G 5/0069
10,665,038 B2    5/2020 Crist
(Continued)

FOREIGN PATENT DOCUMENTS

| EP | 3251108 | 12/2017 |
| WO | 2017084031 | 5/2017 |
| WO | WO-2021086533 A1 | 5/2021 |

OTHER PUBLICATIONS

U.S. Appl. No. 16/668,888 U.S. Pat. No. 10,854,019, filed Oct. 30, 2019, Methods and Systems for Remote Identification, Messaging, and Tolling of Aerial Vehicles.

(Continued)

*Primary Examiner* — Richard M Camby
(74) *Attorney, Agent, or Firm* — Schwegman Lundberg & Woessner, P.A.

(57) ABSTRACT

A system for airspace tolling determines a presence of an aerial vehicle in a monitored airspace and determines a unique identity of the aerial vehicle. The system then determines an operator of the aerial vehicle and accesses an account associated with the operator. The system applies a charge to the account of the operator in response to the detection and identification of the aerial vehicle in the monitored airspace.

16 Claims, 6 Drawing Sheets

(56) References Cited

U.S. PATENT DOCUMENTS

| | | | | |
|---|---|---|---|---|
| 10,854,019 | B1* | 12/2020 | Barnes | G08G 5/006 |
| 2003/0093187 | A1* | 5/2003 | Walker | B64D 45/0034 |
| | | | | 701/1 |
| 2012/0209636 | A1 | 8/2012 | Sloan et al. | |
| 2014/0277834 | A1* | 9/2014 | Levien | B64C 39/024 |
| | | | | 701/2 |
| 2014/0371952 | A1 | 12/2014 | Ohtomo et al. | |
| 2015/0254214 | A1 | 9/2015 | Rosenberg | |
| 2016/0117929 | A1* | 4/2016 | Chan | G06Q 30/04 |
| | | | | 701/3 |
| 2016/0117931 | A1* | 4/2016 | Chan | G08G 5/0034 |
| | | | | 701/120 |
| 2016/0117933 | A1* | 4/2016 | Chan | G08G 5/0086 |
| | | | | 705/317 |
| 2016/0225264 | A1* | 8/2016 | Taveira | G08G 5/0013 |
| 2016/0253907 | A1 | 9/2016 | Taveira | |
| 2017/0015415 | A1* | 1/2017 | Chan | B60L 53/126 |
| 2019/0114925 | A1 | 4/2019 | Schulman et al. | |
| 2019/0251850 | A1* | 8/2019 | Stewart | G08G 5/0026 |
| 2019/0367184 | A1 | 12/2019 | Tremblay et al. | |
| 2020/0035041 | A1 | 1/2020 | Crist | |

OTHER PUBLICATIONS

"International Application Serial No. PCT US2019 036619, International Search Report dated Oct. 7, 2019", 4 pgs.

"International Application Serial No. PCT US2019 036619, Written Opinion dated Oct. 7, 2019", 5 pgs.

"U.S. Appl. No. 16/668,888, Non Final Office Action dated May 20, 2020", 8 pgs.

"U.S. Appl. No. 16/668,888, Notice of Allowability dated Sep. 8, 2020", 2 pgs.

"U.S. Appl. No. 16/668,888, Notice of Allowance dated Jul. 24, 2020", 9 pgs.

"U.S. Appl. No. 16/668,888, Response filed Jul. 1, 2020 to Non Final Office Action dated May 20, 2020", 12 pgs.

"International Application Serial No. PCT/US2019/036619, International Preliminary Report on Patentability dated Dec. 24, 2020", 7 pgs.

"International Application Serial No. PCT/US2020/053493, International Search Report dated Jan. 18, 2021", 3 pgs.

"International Application Serial No. PCT/US2020/053493, Written Opinion dated Jan. 18, 2021", 6 pgs.

* cited by examiner

AIRSPACE TOLLING

TECHNICAL FIELD

Embodiments described herein generally relate to monitoring and control of air traffic and, more particularly, to detection, regulation, and tolling of aerial vehicles to manage air congestion and secure revenue.

RELATED APPLICATIONS

The present application claims priority to U.S. Provisional Application Ser. No. 62/683,421, filed on Jun. 11, 2018, which is incorporated herein by reference in its entirety.

BACKGROUND

Automated aerial vehicles are finding increasing usefulness in civilian applications. For instance, unmanned aerial vehicles (UAVs) are used for a variety of aerial photography and videography tasks, cartography, transportation of goods and people (e.g., air taxis), package delivery, agricultural work such as crop dusting and inspection, traffic monitoring and control, and various law-enforcement and security uses. With increasing use of automated aerial vehicles comes an increasing need for safety and congestion management.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Aspects of the embodiments are directed to systems and methods for facilitating airspace tolling. In the present context, airspace tolling refers to regulation of access to airspace with the use of a cost model. The cost model may include a financial cost structure, a non-financial cost structure (e.g., temporal access to the airspace), or both.

According to aspects of the embodiments, airspace tolling may provide a source of revenue as delivery and transport methods utilize airspace. In some aspects, airspace tolling may reduce Class G airspace congestion. Additionally, some aspects facilitate the management of private or corporate airspace use.

Aspects of the embodiments may be implemented as part of a radio-based detection and communications platform integrated, or interfaced, with a computing platform. The detection, communication, and computing platforms may be implemented as one physical machine, or may be distributed among multiple physical machines, such as by role or function, or by process thread in the case of a cloud-computing or distributed model. In various embodiments, certain operations may be configured to run in virtual machines that in turn are executed on one or more physical machines. It will be understood by persons of skill in the art that features of the present subject matter may be realized by a variety of different suitable machine implementations.

Figure 1:
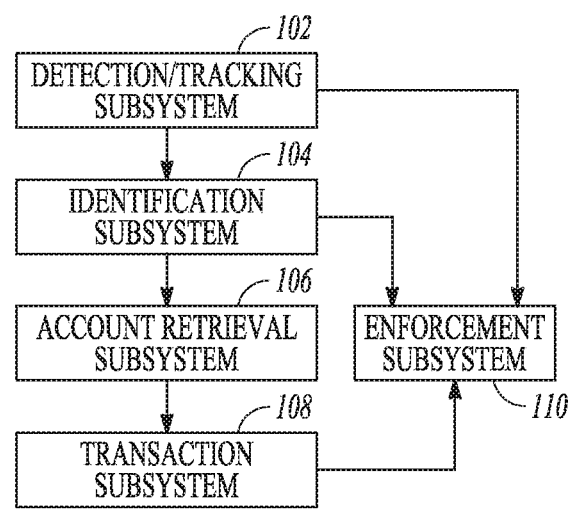
FIG. 1 is a high-level diagram illustrating a system for facilitating airspace tolling according to some examples.

FIG. 1 is a high-level diagram illustrating a system for carrying out airspace tolling operations according to some aspects of the embodiments. Detection and tracking subsystem 102 utilizes detection and ranging technology, such as radio-frequency (RF) based detection, to monitor a volume of airspace for the presence of an aircraft such as an unmanned air vehicle (UAV) or an automated aerial vehicle. A variety of suitable detection techniques may be employed, including techniques that have been developed for detection and tracking of adversary aircraft (e.g., scanning Industrial, Scientific, and Medical (ISM) frequency bands for UAV RF activity). In some embodiments, detection and tracking subsystem 102 may further include, for example, sensors including image sensors to supplement aerial vehicle detection. In some, but not necessarily in all embodiments, smaller radars operating with specific frequency bands may be deployed for detection of small UAVs such as delivery drones.

Detection of the aircraft in the airspace facilitates and initiates operations to identify the aircraft. To this end, detection of the aircraft may facilitate operation of identification subsystem 104 to receive telemetry signaling from the detected aircraft. For example, tracking of the aircraft by detection and tracking subsystem 102 may provide information on the approximate location, heading, and speed of the aircraft, which may be used to facilitate directional reception of telemetry signaling of the aircraft by identification subsystem 104. Accordingly, identification subsystem 104, on receiving telemetry signaling from the detected estimated location of the aircraft, may associate emitted unique identifying information (e.g., a global unique identifier (GUID)) broadcast by the aircraft, with the detected aircraft.

Account retrieval subsystem 106 includes a database, or an interface to access a database, of aerial vehicle operators and their respective associations with identifiers of specific aerial vehicles. Such a database may be maintained by a third party, such as a governmental agency (e.g., the Federal Aviation Administration (FAA), or a private entity).

In addition, account retrieval subsystem 106 includes a computation engine configured to determine an aerial vehicle operator of the detected and identified aerial vehicle, and to retrieve a transaction account established for that aerial vehicle operator.

In a related embodiment, account retrieval subsystem 106 may determine whether the aerial vehicle or the operator of the aerial vehicle is authorized, or authorizable, to access the airspace. For example, an authorized aerial vehicle may be permitted to enter the airspace and may have an account established in which there is sufficient credit to permit the access. An authorizable aerial vehicle may have an account established by its operator, but the account may lack credits at the current time. Nonetheless, the account may be in good standing and credits may be obtained via transaction. An unauthorized vehicle is one whose operator is unknown, lacks an account, or is associated with an account that is in bad standing, or which has entered restricted airspace (for which fines or penalties may be levied against the operator), for example.

Transaction subsystem 108 is configured to process financial or non-financial transactions for accounts of aerial vehicle operators. For instance, transaction subsystem 108 may add a charge to the financial account of the aerial vehicle operator of the detected and identified aerial vehicle, in response to the detection and identification by the detection and identification subsystems 102, 104.

As an example of a non-financial transaction, an aerial vehicle operator may be allocated a certain amount of airspace access credits for a given airspace. Accordingly, in response to an instance in which an aerial vehicle belonging to that operator accesses that airspace, the operator's airspace access credits may be debited.

The airspace access may be measurable in terms of duration that an aerial vehicle uses the airspace. In a related example, the airspace access may be subdivided spatially. For example, different altitudes within an airspace may be subject to different costing schedules. Airspace may also be subject to surge charging during periods of known peak activity or high congestion. Accordingly, tiered pricing models may be employed in various toll zones according to some embodiments.

In some embodiments, enforcement subsystem 110 is included. Enforcement subsystem 110 may operate in response to unauthorized access of an airspace, whether by an aerial vehicle of a known operator that lacks access rights (e.g., due to lack of access credits or having an account in bad standing), by a rogue aerial vehicle of unknown provenance, or by a vehicle entering restricted airspace. Enforcement subsystem 110 may notify a law enforcement entity to take appropriate action in response to an unauthorized access of the airspace. In other examples, enforcement subsystem 110 may take actions to disrupt the operation of the unauthorized aerial vehicle (e.g., using RF jamming or overriding of the control signaling being supplied to the unauthorized aerial vehicle). In a related example, enforcement subsystem 110 accesses vehicle-identification information to ascertain the type of aerial vehicle that is the potential subject of enforcement action, and it determines the most appropriate enforcement actions taking into account the vehicle type, payload type, and other factors, so that enforcement may be accomplished safely, thus avoiding harm to people and property.

Figure 5A:
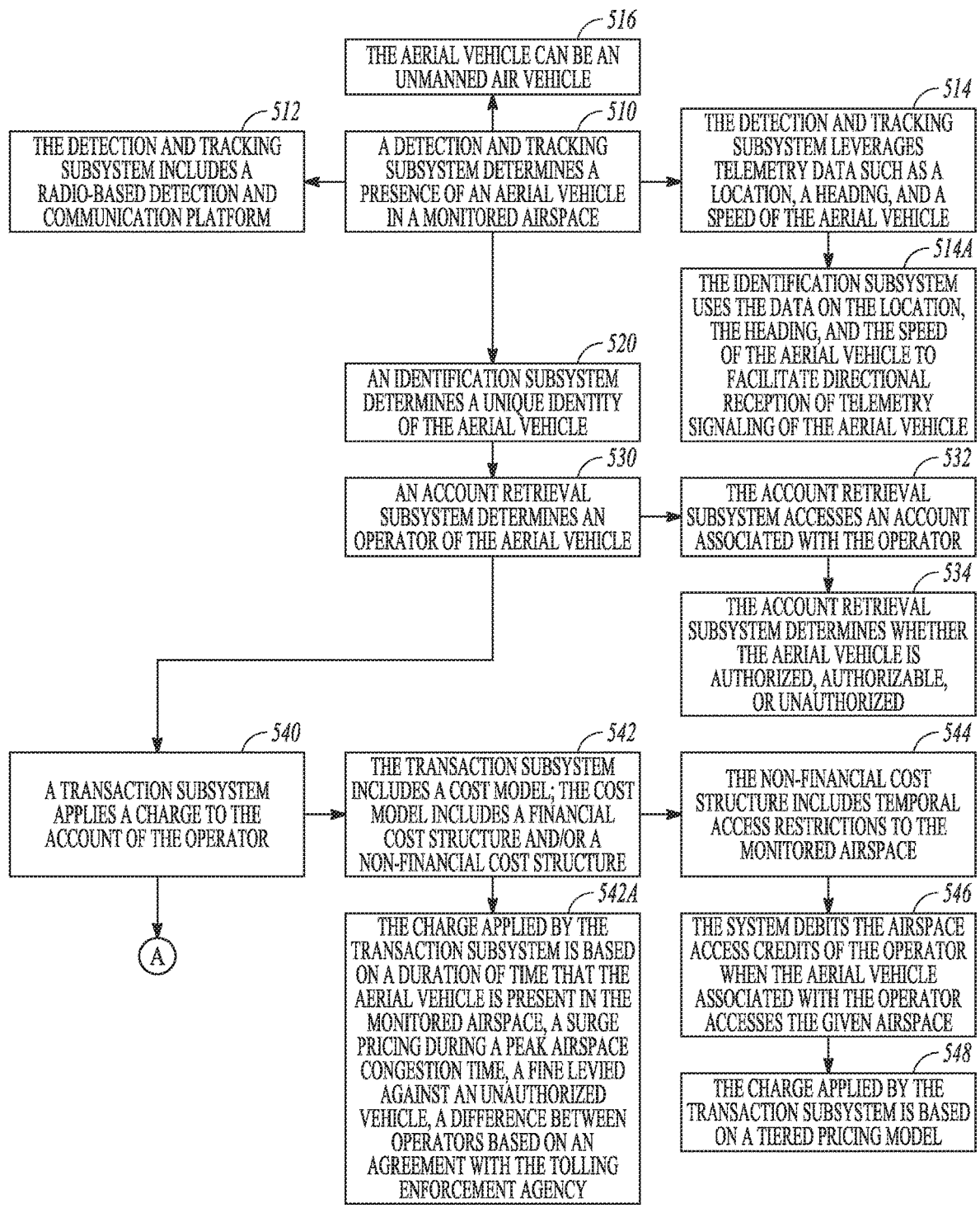
FIGS. 5A-5B are a block diagram of operations and features of a system and method for airspace tolling.
Figure 5B:
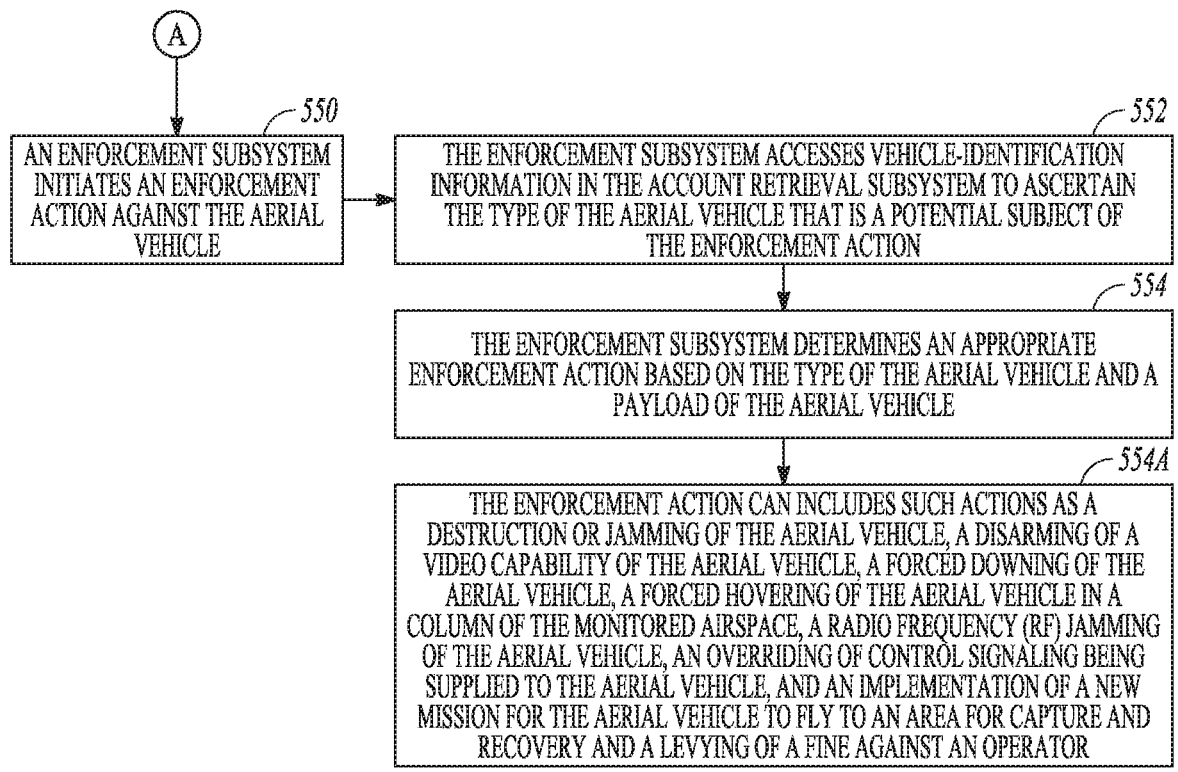

FIGS. 5A and 5B are another diagram illustrating a system for carrying out airspace tolling operations according to some aspects of the embodiments. FIGS. 5A and 5B include process blocks 510-554A. Though arranged substantially serially in the example of FIGS. 5A and 5B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 5A and 5B, at 510, a detection and tracking subsystem determines a presence of an aerial vehicle in a monitored airspace. The detection and tracking subsystem can include a radio-based detection and communication platform (512). The detection and tracking subsystem leverages telemetry data as input, including, but not limited to, a location, a heading, and a speed of the aerial vehicle (514). As indicated at 516, the aerial vehicle can be an unmanned air vehicle.

At 520, an identification subsystem determines a unique identity of the aerial vehicle in response to the detection of the aerial vehicle in the monitored airspace. The identification subsystem uses the data on the location, the heading, and the speed of the aerial vehicle (from the detection and tracking system) to facilitate directional reception of telemetry signaling of the aerial vehicle (514A).

At 530, an account retrieval subsystem determines an operator of the aerial vehicle based on a database of aerial vehicle and operator associations. At 532, the account retrieval subsystem accesses an account associated with the operator. At 534, the account retrieval subsystem determines whether the aerial vehicle is authorized, authorizable, or unauthorized.

At 540, a transaction subsystem applies a charge to the account of the operator in response to the detection and identification of the aerial vehicle in the monitored airspace. As indicated at 542, the transaction subsystem can include a cost model, and the cost model can include a financial cost structure and/or a non-financial cost structure. As indicated at 542A, the charge applied by the transaction subsystem can be based on one or more of a duration of time that the aerial vehicle is present in the monitored airspace, surge pricing during peak airspace congestion times, fines levied against an unauthorized vehicle, differences between operators based on agreement with the tolling enforcement agency. As indicated at 544, the non-financial cost structure can include temporal access restrictions to the monitored airspace. These temporal access restrictions can include a feature such as the operator being allocated an amount of airspace access credits for a given airspace. At 546, the system debits the airspace access credits of the operator when the aerial vehicle associated with the operator accesses the given airspace. The charge applied by the transaction subsystem can be based on a tiered pricing model such that different altitudes and different geographic regions within the monitored airspace are subject to different costing schedules (548), and surge charging during peak traffic times may be in effect.

As further indicated at 550, an enforcement subsystem initiates an enforcement action against the aerial vehicle in response to the aerial vehicle having been determined to lack authorization to enter the monitored airspace or having failed to provide requisite identification information. Regarding the failure to provide requisite information, as an example, a detected aerial vehicles may fail to supply identification for an extended period of time, resulting in enforcement action. At 552, the enforcement subsystem accesses vehicle-identification information in the account retrieval subsystem to ascertain the type of the aerial vehicle that is a potential subject of the enforcement action. At 554, the enforcement subsystem determines an appropriate enforcement action based on the type of the aerial vehicle and a payload of the aerial vehicle. As indicated at 554A, the enforcement action can includes such actions as an operator fine, a destruction or jamming of the aerial vehicle, a disarming of a video capability of the aerial vehicle, a forced downing of the aerial vehicle, a forced hovering of the aerial vehicle in a column of the monitored airspace, a radio frequency (RF) jamming of the aerial vehicle, an overriding of control signaling being supplied to the aerial vehicle, and an implementation of a new mission for the aerial vehicle to fly to an area for capture and recovery, as examples. In some embodiments, one or more enforcement actions may be temporarily applied, e.g., in a reversible manner, until a confirmation can be made regarding the aerial vehicle. For example, rather than immediate destruction or jamming of the aerial vehicle upon detection of lack authorization of entry into the monitored airspace (or failure to provide authentication credentials), the enforcement subsystem 110 may temporarily disarm the video capability or restrict/confine the movement of the aerial vehicle, and may attempt subsequent authentication attempts. If a subsequent attempt for authentication is successful, the disabled video capability of the aerial vehicle may be re-enabled.

In some embodiments, tolls may be generated based off tag identifiers making distinction between commercial vehicles, recreational vehicles, municipal/service use vehicles, size, weight, number of motors, noise, and speed. Various features of the embodiments described herein provide an ability to tie in telemetry and carrier characteristics that allows tolling based off altitude of the vehicle or use case (e.g., different classes of air space), etc. For example, lower altitudes may be more desirable for delivery applications because of the need to repeatedly return to the earth's surface for the delivery of packages. As another example, an aerial vehicle flying at 10,000 feet may pay $1, where those flying at 5,000 feet may pay $2. This essentially carves up the air space into sectors that can be differentiated due to the telemetry being sent from the drone. The 10,000 foot range listed is for detection and the directions are dependent on the antenna selected for the implementation. Some could be omni-directional and provide full coverage, while others may want directional coverage. This could also be scaled up if areas have higher congestion.

The tolling mechanism described herein is non-linear "cell"/grid based, geofenced based. In general, airspace is a much larger space (e.g., relative to ground space/areas subject to tolling) and things can pass through at many angles. Depending on how tolling stations are setup certain zones can be skipped. For example in one scenario one aerial vehicle could go from zone 1 to zone 2 to zone 3, whereas a different aerial vehicle may just go from zone 1 to zone 3.

The tolling method and system described herein can allow for objects that are static to be tolled and are not passing through. For example, a UAS just moving vertically without significant X/Y axis movement to cross into other stations detection radius. Any flights in the toll zone even if they are not actively moving through still pay a toll.

Some features of the tolling system allow tolling based on a duration of time a vehicle stays in the monitored airspace. This ensures those that stay in the toll zone longer will pay for the total time. This is not the case with other types of tolling, e.g., ground vehicle tolling examples, which does not take into account the time duration. This could also be scaled up if areas have higher congestion.

Detection of untagged items may provide good metrics for coverage and whether additional or reduced number of stations are desirable. The metrics could also be good for determining pricing models for tolls/rates for their use cases. Metrics can also be used to validate/verify information: for example, 30 deliveries listed at depot, but tolling only showed 25.

Compared to tolling systems for cars, the detection range for use in airspace tolling systems described herein is much larger. For example, in some embodiments, the expected range is up to 10 km. The range may also extend in all directions.

Figure 2:
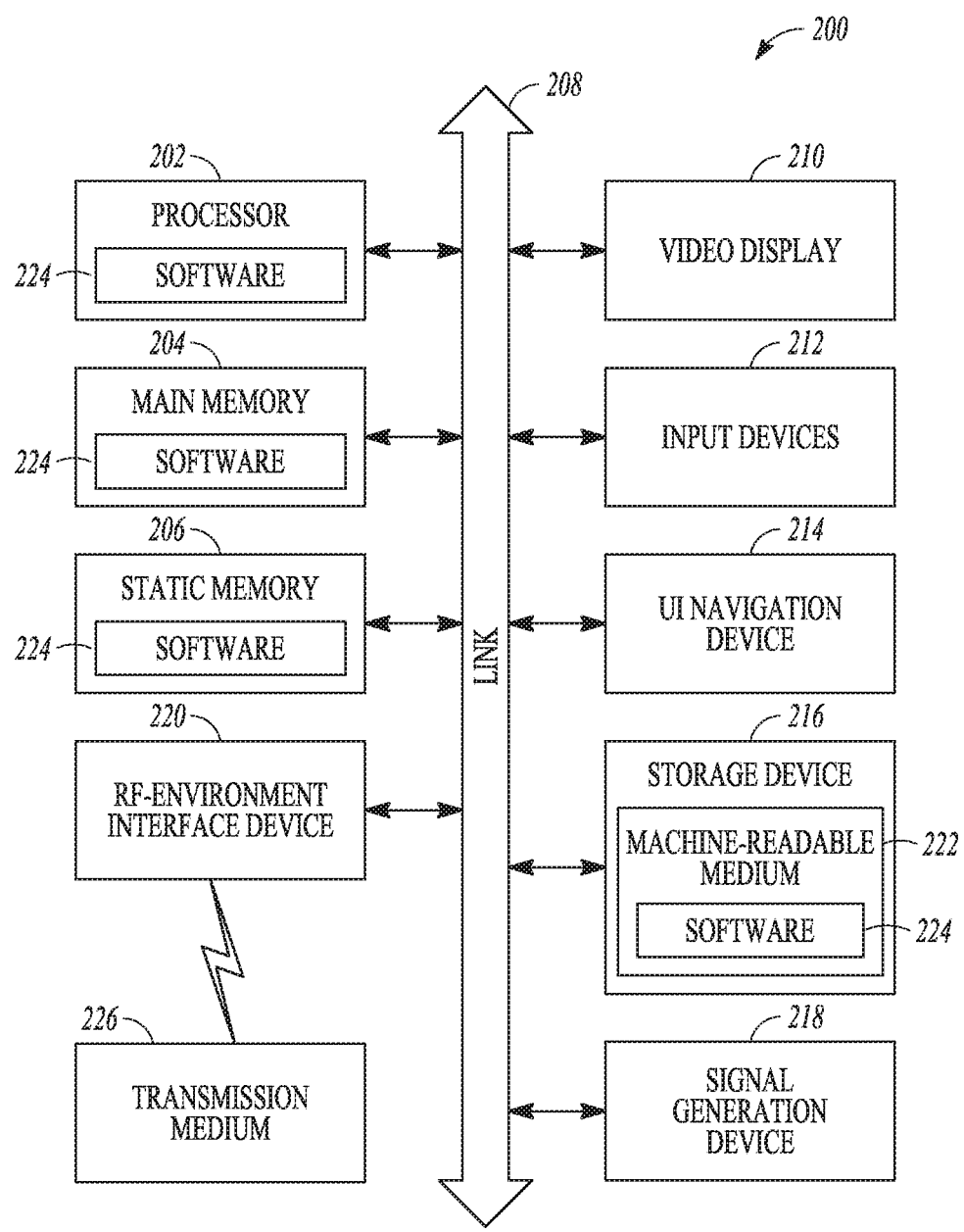
FIG. 2 is a block diagram illustrating a computing platform in the example form of a general-purpose machine.

FIG. 2 is a block diagram illustrating a computing and communications platform 200 in the example form of a general-purpose machine on which some or all of the system of FIG. 1 may be carried out according to various embodiments. In certain embodiments, programming of the computing platform 200 according to one or more particular algorithms produces a special-purpose machine upon execution of that programming. In a networked deployment, the computing platform 200 may operate in the capacity of either a server or a client machine in server-client network environments, or it may act as a peer machine in peer-to-peer (or distributed) network environments. Computing platform 200, or some portions thereof, may represent an example architecture of computing platform 106 or external computing platform 104 according to one type of embodiment.

Example computing platform 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The computing platform 200 may further include a video display unit 210, input devices 212 (e.g., a keyboard, camera, microphone), and a user interface (UI) navigation device 214 (e.g., mouse, touchscreen). The computing platform 200 may additionally include a storage device 216 (e.g., a drive unit), a signal generation device 218 (e.g., a speaker), and a RF-environment interface device (RFEID) 220.

The storage device 216 includes a non-transitory machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the computing platform 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

RFEID 220 includes radio receiver circuitry, along with analog-to-digital conversion circuitry, and interface circuitry to communicate via link 208 according to various embodiments. Various form factors are contemplated for RFEID 220. For instance, RFEID may be in the form of a wideband radio receiver, or scanning radio receiver, that interfaces with processor 202 via link 208. In one example, link 208 includes a PCI Express (PCIe) bus, including a slot into which the NIC form-factor may removably engage. In another embodiment, RFEID 220 includes circuitry laid out on a motherboard together with local link circuitry, processor interface circuitry, other input/output circuitry, memory circuitry, storage device and peripheral controller circuitry, and the like. In another embodiment, RFEID 220 is a peripheral that interfaces with link 208 via a peripheral input/output port such as a universal serial bus (USB) port. RFEID 220 receives RF emissions over wireless transmission medium 226. RFEID 220 may be constructed to receive RADAR signaling, radio communications signaling, unintentional emissions, or some combination of such emissions.

Figure 3:
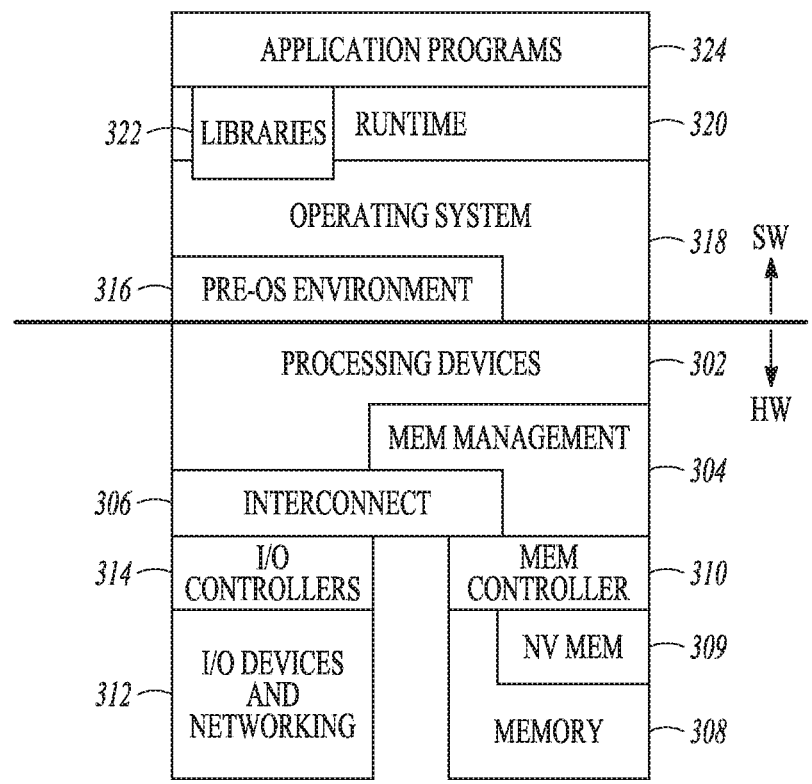
FIG. 3 is a diagram illustrating an exemplary hardware and software architecture of a computing device such as the one depicted in FIG. 2, in which various interfaces between hardware components and software components are shown.

FIG. 3 is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc.), each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI, USB, etc. Memory 308 (e.g., dynamic random access memory or DRAM) and non-volatile memory 309 such as flash memory (e.g., electrically-erasable read-only memory such as EEPROM, NAND Flash, NOR Flash, etc.) are interfaced with memory management device 304 and interconnect 306 via memory controller 310. This architecture may support direct memory access (DMA) by peripherals in one type of embodiment. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316 is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316, is responsible for initiating the launching of the operating system, but also provides an execution environment for embedded applications according to certain aspects of the invention.

Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) engine that facilitates interaction with the user via peripheral devices such as a monitor, keyboard, mouse, microphone, video camera, touchscreen, and the like.

Runtime system 320 implements portions of an execution model, including such operations as putting parameters onto the stack before a function call, the behavior of disk input/output (I/O), and parallel execution-related behaviors. Runtime system 320 may also perform support services such as type checking, debugging, or code generation and optimization.

Libraries 322 include collections of program functions that provide further abstraction for application programs. These include shared libraries and dynamic linked libraries (DLLs), for example. Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324 are those programs that perform useful tasks for users, beyond the tasks performed by lower-level system programs that coordinate the basis operability of the computing device itself.

Figure 4:
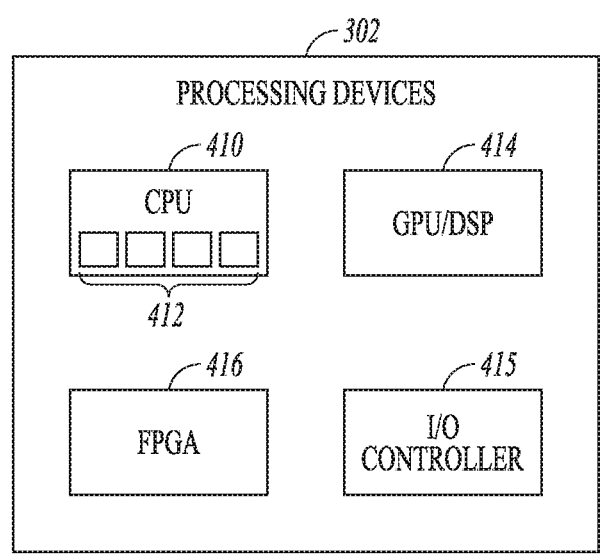
FIG. 4 is a block diagram illustrating examples of processing devices that may be implemented on a computing platform, such as the computing platform described with reference to FIGS. 2-3, according to an embodiment.

FIG. 4 is a block diagram illustrating processing devices 302 according to one type of embodiment. CPU 410 may contain one or more processing cores 412, each of which has one or more arithmetic logic units (ALU), instruction fetch unit, instruction decode unit, control unit, registers, data stack pointer, program counter, and other essential components according to the particular architecture of the processor. As an illustrative example, CPU 410 may be a x86-type of processor. Processing devices 302 may also include a graphics processing unit (GPU) or digital signal processor (DSP) 414. In these embodiments, GPU/DSP 414 may be a specialized co-processor that offloads certain computationally-intensive operations, particularly those associated with numerical computation, from CPU 410. Notably, CPU 410 and GPU/DSP 414 may work collaboratively, sharing access to memory resources, I/O channels, etc.

Processing devices 302 may also include a specialized processor 416, such a field-programmable gate array (FPGA), for example. Specialized processor 416 generally does not participate in the processing work to carry out software code as CPU 410 and GPU 414 may do. In one type of embodiment, specialized processor 416 is configured to execute time-critical operations, such as real-time, or near-real-time signal processing. Specialized processor 416 may execute dedicated firmware. Specialized processor 416 may also include a dedicated set of I/O facilities to enable it to communicate with external entities. Input/output (I/O) controller 415 coordinates information flow between the various processing devices 410, 414, 416, as well as with external circuitry, such as a system interconnect.

Examples, as described herein, may include, or may operate on, logic or a number of components, circuits, or engines, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more computing platforms (e.g., a standalone, client or server computing platform) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

Figure 6:
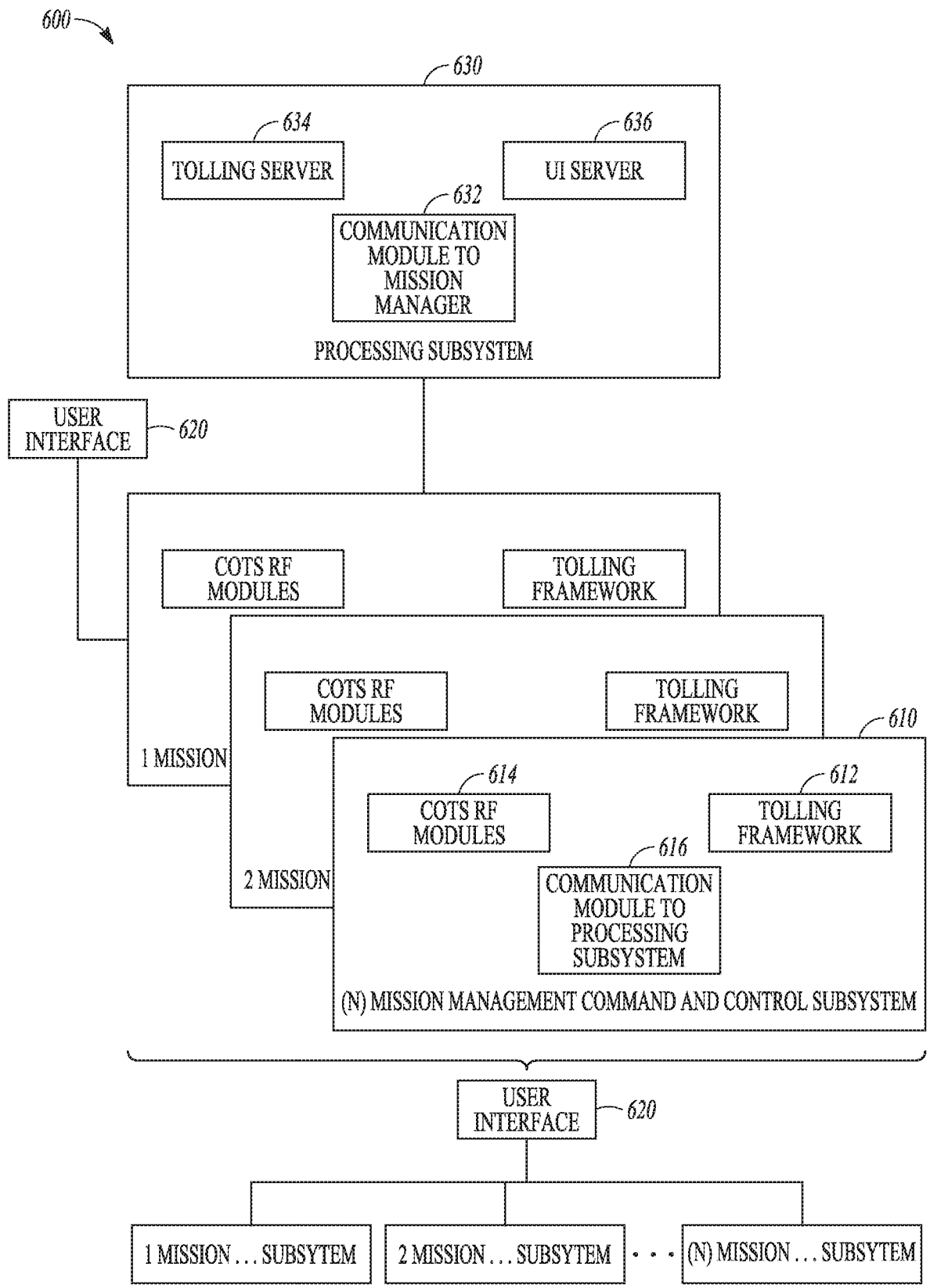
FIG. 6 is a system-architecture diagram illustrating a system facilitating airspace tolling according to an example.

FIG. 6 is a system-architecture diagram illustrating a system 600 facilitating airspace tolling according to an example. Among various components, the system includes a processing subsystem 630. The processing subsystem 630 includes a communication module to mission manager 632, a tolling server 634, and a user interface (UI) server 636. In some examples, the tolling server 634 is configured to implement the data-processing portions of detection/tracking subsystem 102 as shown in FIG. 1. The processing subsystem 630 is coupled to one or more mission management command and control subsystems 610 that include a tolling framework 612 that is configured to identify the operator of the aerial vehicle (e.g., based on telemetry and vehicle broadcast data), and to initiate transactions, such as invoicing of the operator according to the established tolling transaction model, which may include tiered pricing, etc., which may be configurable based on the airspace manager's defined toll zones and other parameters. The mission management command and control subsystem 610 further includes commercial off the shelf (COTS) radio frequency (RF) communication modules 614. The RF communication modules 614 may include analog/software defined radio (SDR) units, amplifier/combiner/splitter componentry, and other components. These components may implement the RF portions of detection/tracking subsystem 102 as shown in FIG. 1. The mission management command and control subsystem 610 further includes a communication module 616 for communications with the processing subsystem 630. Backend tolling framework 612 may include subsystems 104, 106 and 108 as described above with reference to FIG. 1, for example. In some embodiments, the mission manager/command and control subsystem 610 may also include an enforcement subsystem (such as enforcement subsystem 110, for example). The system may further include a customizable user interface 620, which may be configurable by the system operator (e.g., managers of the airspace).

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for airspace tolling, the system comprising:
   a detection and tracking subsystem to determine a presence of an aerial vehicle in a monitored airspace;
   an identification subsystem to determine a unique identity of the aerial vehicle in response to the detection of the aerial vehicle in the monitored airspace;
   an account retrieval subsystem to determine an operator of the aerial vehicle based on a database of aerial vehicle and operator associations, and to access an account associated with the operator;

a transaction subsystem to apply a charge to the account of the operator in response to the detection and identification of the aerial vehicle in the monitored airspace; and an enforcement subsystem to initiate an enforcement action against the aerial vehicle in response to the aerial vehicle having been determined to lack authorization to enter the monitored airspace or having failed to provide requisite identification information;

wherein the enforcement subsystem accesses vehicle-identification information in the account retrieval subsystem to ascertain the type of the aerial vehicle that is a potential subject of the enforcement action; and wherein the enforcement subsystem determines an appropriate enforcement action based on the type of the aerial vehicle and a payload of the aerial vehicle.

2. The system of claim 1, wherein the enforcement action comprises one or more of a levying of a fine against the operator, a destruction or jamming of the aerial vehicle, a disarming of a video capability of the aerial vehicle, a forced downing of the aerial vehicle, a forced hovering of the aerial vehicle in a column of the monitored airspace, a radio frequency (RF) jamming of the aerial vehicle, an overriding of control signaling being supplied to the aerial vehicle, and an implementation of a new mission for the aerial vehicle to fly to an area for capture and recovery.

3. The system of claim 1, wherein the aerial vehicle comprises an unmanned air vehicle.

4. The system of claim 1, wherein the transaction subsystem comprises a cost model, and wherein the cost model comprises one or more of a financial cost structure and a non-financial cost structure.

5. The system of claim 4, wherein the non-financial cost structure comprises temporal access restrictions to the monitored airspace such that the operator is allocated an amount of airspace access credits for a given airspace; and wherein the system debits the airspace access credits of the operator when the aerial vehicle associated with the operator accesses the given airspace.

6. The system of claim 1, wherein the detection and tracking subsystem comprises a radio-based detection and communication platform.

7. The system of claim 1, wherein the detection and tracking subsystem leverages telemetry data such as a location, a heading, and a speed of the aerial vehicle; and wherein the identification subsystem uses the data on the location, the heading, and the speed of the aerial vehicle to facilitate directional reception of telemetry signaling of the aerial vehicle.

8. The system of claim 1, wherein the account retrieval subsystem determines whether the aerial vehicle is authorized, authorizable, or unauthorized.

9. The system of claim 1, wherein the charge applied by the transaction subsystem is based on one or more of a duration of time that the aerial vehicle is present in the monitored airspace, a surge pricing during a peak airspace congestion time, a fine levied against an unauthorized vehicle, a difference between operators based on an agreement with the tolling enforcement agency.

10. The system of claim 1, wherein the charge applied by the transaction subsystem is based on a tiered pricing model such that different altitudes and different geographic regions within the monitored airspace are subject to different costing schedules.

11. A process for airspace tolling comprising:
determining a presence of an aerial vehicle in a monitored airspace;

determining a unique identity of the aerial vehicle in response to the detection of the aerial vehicle in the monitored airspace;

determining an operator of the aerial vehicle based on a database of aerial vehicle and operator associations, and to access an account associated with the operator;

applying a charge to the account of the operator in response to the detection and identification of the aerial vehicle in the monitored airspace; and initiating an enforcement action against the aerial vehicle in response to the aerial vehicle having been determined to lack authorization to enter the monitored airspace or having failed to provide requisite identification information;

wherein the enforcement action comprises accessing vehicle-identification information to ascertain a type of the aerial vehicle that is a potential subject of the enforcement action;

wherein the enforcement action comprises determining an appropriate enforcement action based on the type of the aerial vehicle and a payload of the aerial vehicle; and wherein the enforcement action comprises one or more of a levying of a fine against the operator, a destruction or jamming of the aerial vehicle, a disarming of a video capability of the aerial vehicle, a forced downing of the aerial vehicle; a forced hovering of the aerial vehicle in a column of the monitored airspace, a radio frequency (RF) jamming of the aerial vehicle, an overriding of control signaling being supplied to the aerial vehicle, and an implementation of a new mission for the aerial vehicle to fly to an area for capture and recovery.

12. The process of claim 11, wherein the applying a charge to the account of the operator comprises a cost model; wherein the cost model comprises one or more of a financial cost structure and a non-financial cost structure; and wherein the non-financial cost structure comprises temporal access restrictions to the monitored airspace such that the operator is allocated an amount of airspace access credits for a given airspace; and wherein the system debits the airspace access credits of the operator when the aerial vehicle associated with the operator accesses the given airspace.

13. The process of claim 11, wherein the determining the presence of an aerial vehicle comprises leveraging telemetry data such as a location, a heading, and a speed of the aerial vehicle for facilitating directional reception of telemetry signaling of the aerial vehicle.

14. The process of claim 11, comprising determining whether the aerial vehicle is authorized, authorizable, or unauthorized.

15. The process of claim 11; wherein the applying a charge to the account is based on a tiered pricing model such that different altitudes and different geographic regions within the monitored airspace are subject to different costing schedules.

16. A non-transitory computer readable medium comprising instructions that when executed by a processor execute a process comprising:
determining a presence of an aerial vehicle in a monitored airspace;

determining a unique identity of the aerial vehicle in response to the detection of the aerial vehicle in the monitored airspace;

determining an operator of the aerial vehicle based on a database of aerial vehicle and operator associations, and to access an account associated with the operator;

applying a charge to the account of the operator in response to the detection and identification of the aerial vehicle in the monitored airspace;

initiating an enforcement action against the aerial vehicle in response to the aerial vehicle having been determined to lack authorization to enter the monitored airspace or having failed to provide requisite identification information;

wherein the enforcement action comprises accessing vehicle-identification information to ascertain a type of the aerial vehicle that is a potential subject of the enforcement action;

wherein the enforcement action comprises determining an appropriate enforcement action based on the type of the aerial vehicle and a payload of the aerial vehicle; and wherein the enforcement action comprises one or more of a destruction or jamming, of the aerial vehicle, a disarming of a video capability of the aerial vehicle, a forced downing of the aerial vehicle, a forced hovering of the aerial vehicle in a column of the monitored airspace, a radio frequency (RF) jamming of the aerial vehicle, an overriding of control signaling being supplied to the aerial vehicle, and an implementation of a new mission for the aerial vehicle to fly to an area for capture and recovery.

* * * * *